Nov. 29, 1932.  A. J. KILMER  1,889,248
ADJUSTABLE TOOL SUPPORT
Filed April 10, 1931   2 Sheets-Sheet 2
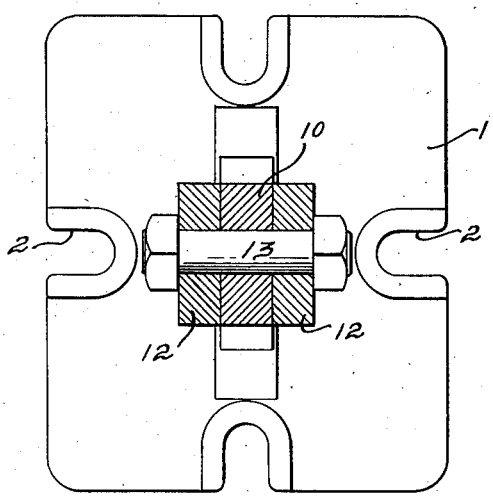
FIG. 4.
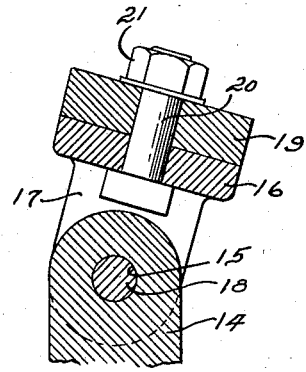
FIG. 5.
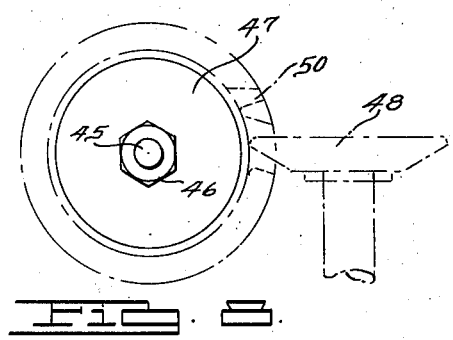
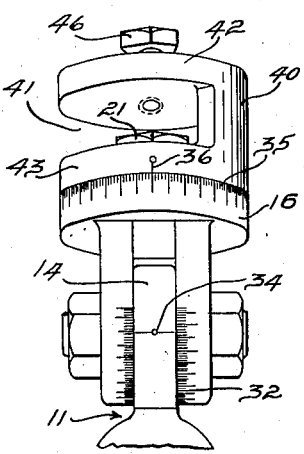
FIG. 6.
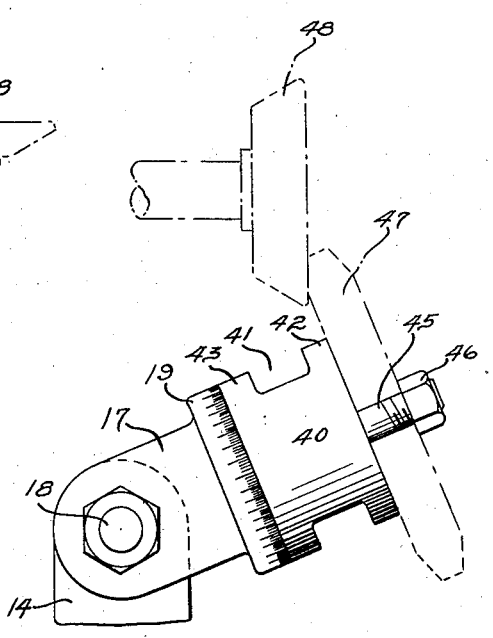
FIG. 7.
INVENTOR
Austin J. Kilmer.
BY
Harness, Dickey, Pierce & Hann
ATTORNEYS.

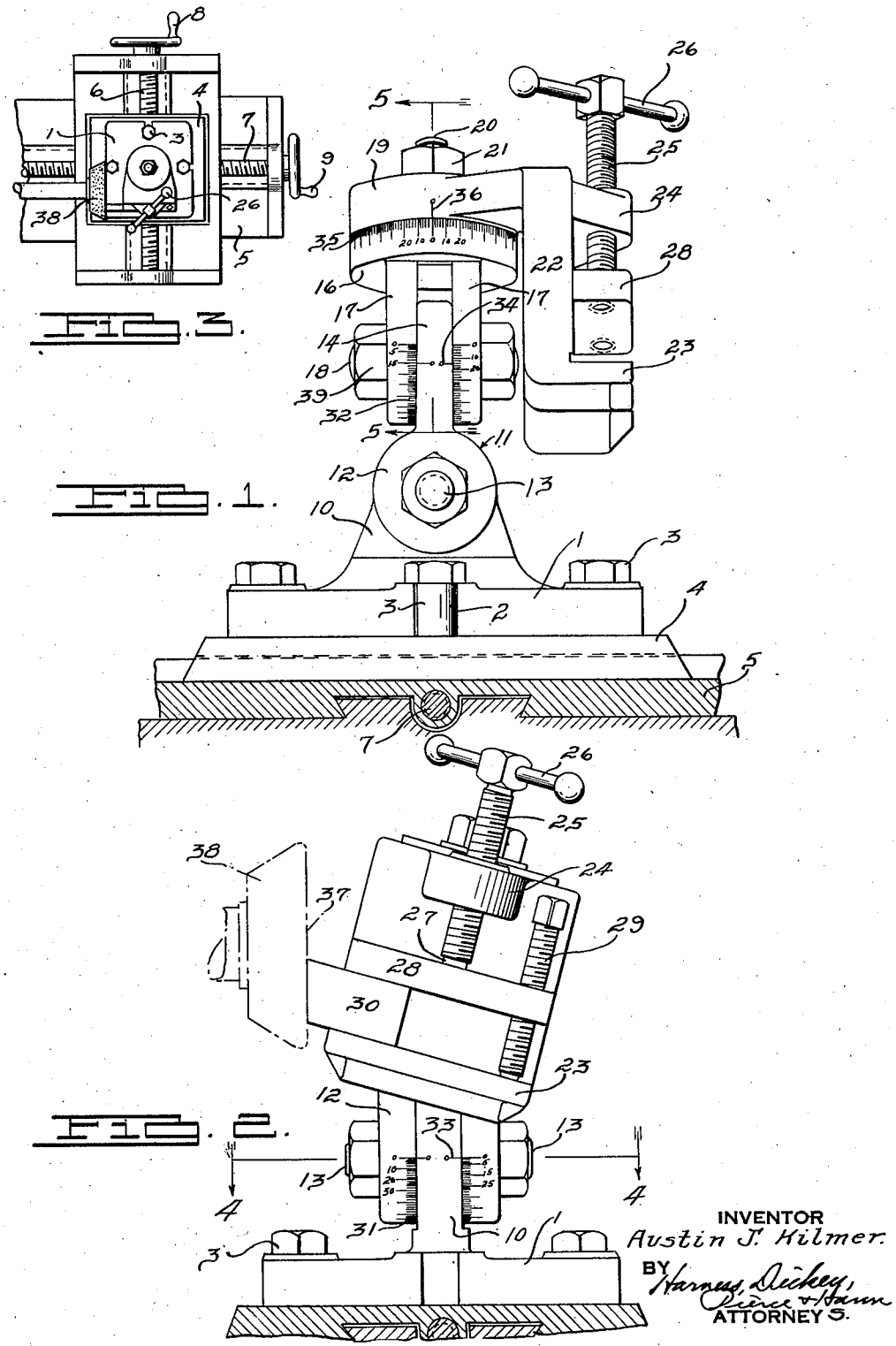

Patented Nov. 29, 1932

1,889,248

UNITED STATES PATENT OFFICE

AUSTIN J. KILMER, OF ROSEVILLE, MICHIGAN, ASSIGNOR TO MICHIGAN TOOL COMPANY, A CORPORATION OF MICHIGAN

ADJUSTABLE TOOL SUPPORT

Application filed April 10, 1931. Serial No. 529,165.

This invention relates to an improved adjustable tool support and particularly to a support of this kind for holding cutting tools during grinding and dressing of their relatively inclined surfaces.

In dressing a cutting tool it is frequently necessary to place the tool so that its axis is inclined with respect to the working surface of a grinding wheel from several directions at specified angles. Accurate positioning of the tool by first placing it at a predetermined inclination from one direction and then moving it so as to produce a predetermined inclination from another direction has been impossible with adjustable tool support heretofore used for this purpose, for in moving the tool to bring it to the second specified inclination, the inclination from the first direction specified is upset.

The main objects of the invention are to provide an improved adjustable support which is adapted to swing a tool through accurately measured arcuate distances about several axes that are perpendicular to each other so as to incline a tool with respect to a grinding wheel from several different directions and at a specified angle in each direction; to provide a support of this kind which, after it has been conditioned to hold the axis of a tool at a specified inclination from one direction, can be adjusted so as to also hold the axis of the tool at a specified inclination from another direction without varying the first directional inclination of the tool; and to provide an adjustable support which is adapted to hold the axis of a tool at specified inclination from several different directions, both with respect to the face of a grinding wheel and with respect to the periphery thereof.

A further object of the invention is to provide an adjustable fixture of this character which is adapted to rotatably hold a gear cutter or similar tool in contact with a dressing wheel with its axis accurately placed at a predetermined inclination to the axis of the dressing wheel so as to form a specified angle on the periphery or on the side of the gear cutter.

An illustrative embodiment of the invention is shown in the accompanying drawings, in which:

Figure 1 is a side elevation of my improved adjustable support.

Figure 2 is a front elevation of the adjustable support.

Figure 3 is a fragmentary plan view of a grinding machine bed and shiftable cross table, illustrating one manner of mounting the support on a machine.

Figure 4 is a transverse horizontal section taken on line 4—4 of Figure 2.

Figure 5 is a fragmentary vertical section taken on line 5—5 of Figure 1.

Figure 6 is a fragmentary side elevation of the adjustable tool support showing an adapter for conditioning the device, to rotatably hold circular tools in a specified relation to a dressing member.

Figure 7 is a front elevation of the form of the invention shown in Figure 6 illustrating the manner in which a gear cutter or similar tool may be accurately dressed with the aid of the improved tool support.

Figure 8 is a diagrammatic illustration of a gear cutter grinding operation in which grinding tools of the type illustrated in Fig. 7 are employed.

In the form shown in Figures 1 to 5, inclusive, the adjustable cutting tool support includes a base 1 of rectangular shape in the edge portions of which are formed slots 2 for receiving bolts 3 by which the base may be secured to a table or bed of a grinding machine or other device. The base 1 is secured by the bolts 3 to a transversely shiftable plate 4 which is mounted on a longitudinally shiftable carriage 5, as illustrated in Figure 3. The longitudinally and transversely shiftable members 4 and 5 are threaded on screws 6 and 7 which have operating handles 8 and 9 respectively, for shifting the tool support along two substantially perpendicular paths relative to the bed of a machine.

Integrally formed on the base 1 is an upright lug 10 on which is pivotally mounted a lower universal joint element 11 having a bifurcated end 12. The lug 10 is received between the sides of the bifurcated end 12 of the lower universal joint element 11 and it is pivotally secured thereto by a bolt 13. Formed on the other end of the universal joint element 11 is a substantially flat lug 14 having an aperture 15 extending substantially normal to the pivotal axis of the base and universal joint element 11.

An upper universal joint element which includes a disc 16 and spaced, protruding arms 17 is pivotally mounted on the lug 14 of the lower universal joint element by a bolt 18 which passes through the aperture 15 and through registering apertures in the arms 17. The axis of the bolt 18 is in a plane substantially normal to the axis of the bolt 13. A tool clamp 19 is journaled on a threaded stud 20 which is centrally located on the disc 16, as illustrated in Fig. 5, and which is provided with a nut 21 for releasably holding the tool clamp in an adjusted position. The pivotal axis formed by the stud 20 is in a plane substantially normal to the pivotal axis provided by the bolt 18 and it extends axially of the upper universal joint element.

The tool clamp 19 includes a downwardly extending bar 22 on which are formed a stationary jaw 23 and a spaced flange 24. Formed in the flange 24 is an aperture in which is threaded a screw 25 having an operating handle 26 at one end and a reduced portion 27 at its other end. The reduced end portion 27 of the screw is swiveled on or otherwise suitably rotatably attached to a movable jaw 28 which registers with the fixed jaw 23. Threaded in an aperture of one end portion of the movable jaw 28 is a bolt 29 which extends through the jaw 28 and bears upon the fixed jaw 23 so as to adjustably hold one end of the movable jaw in a selected spaced relation to the fixed jaw as illustrated in Fig. 2. The other end of the jaw 28 may be firmly clamped upon a tool 30 by tightening the screw 25 so as to firmly hold the tool between the jaws of the clamp.

The spaced sides of the bifurcated end 12 of the lower universal joint element 11 and the spaced arm 17 of the upper universal joint element have indicia such as graduated scales 31 and 32, respectively, which are calibrated in degrees and which cooperate with zero marks 33 and 34 on the lug 10 of the base and lug 14 of the lower universal joint element, respectively. A scale 35 which is also graduated in degrees is formed on the disc 16 of the upper universal joint element and the clamping member 19 has a zero mark 36 registering with these graduations.

In operation, the shank end portion of the tool 30 is clamped between the jaws 23 and 28 and the zero marks of the scales 31, 32 and 35 are preferably placed in registration with the cooperating zero marks 33, 34 and 36, respectively. When it is desired to grind the end of the tool against a side face 37 of a grinding wheel 38, the clamping element is tilted a selected number of degrees or graduations about the axis of the bolt 18 or common pivot of the universal joint elements. This setting of the tool may be accomplished by observation of the scale 32 and the parts of the device may be firmly fixed in a desired position by tightening the nuts 39 on the bolt 18. This adjustment of the tool places the tool clamp and tool at a proper inclination to the face of the grinding wheel to form a predetermined end clearance on the tool.

When it is desired to form the end of a tool at an inclination of the lateral sides thereof and to also provide an end clearance, the nut 21 may be loosened so as to permit rotation of the clamping element about the axis of the bolt 20 while the upper universal joint element is set at an inclination to the base. With the aid of the scale 35 the tool clamp may be accurately positioned so as to bring the lateral sides of the tool to a selected inclination to the face 37 of the grinding wheel without disturbing the previously fixed inclination of the top and bottom sides of the tool to the face of the grinding wheel.

The end of a tool may also be ground upon the periphery of a grinding wheel by moving the fixture into alignment with the periphery of the wheel. In this case the adjustment of the device required to produce a selected clearance angle at the end of a tool is made by rocking the lower universal joint element about its axis on the lug 10 of the base, and the inclination of the plane of the end of the tool to the lateral sides thereof may be predetermined by turning the tool clamp about the axis of the bolt 20.

When the adjustable tool support is placed in the above relation to a grinding wheel the lateral sides of the tool may be ground upon the face of the wheel to a selected inclination to the top and bottom sides of the tool so as to produce a predetermined side clearance by turning the clamping member 19 and upper universal joint element about the pivotal axis of the latter and the lower universal joint element which is provided by the bolt 18. This latter adjustment of the tool support may be made without disturbing the inclinations at which the tool was previously placed with respect to the working faces of the grinding wheel. In this manner a desired co-relation between the inclinations of the end and sides of the tool may be formed by successively placing the tool at selected inclinations to the working surfaces of the grinding wheel and from diverse directions.

A specified rake may also be formed on the cutting end portion of the tool 30 by turning the latter between the jaws of the clamp, through substantially 90 degrees from the position shown in Fig. 2, and shifting the fixture so as to bring the top side of the tool into registration with the periphery of the grinding wheel. The rake angle may then be set by turning the tool clamp about the axis of the bolt 20 and a specified inclination of the top side of the tool to the lateral sides thereof may be obtained by swinging the lower universal joint element about the pivotal axis provided by the bolt 13.

The adjustable tool support may be readily conditioned to hold a rotary cutter 47 against a dressing wheel so as to dress the teeth 50 of the cutter in accordance with a predetermined contour, by replacing the tool clamp 19 by an adaptor 40. The adaptor 40 is shown as being mainly cylindrical in shape and it is provided with a side recess 41 which is bounded by upper and lower discs 42 and 43 respectively. The lower disc 43 has a central aperture through which the bolt 20 extends, the nut 21 being accessible in the recess 41. Formed in the upper disc 42 is a central aperture in which is threaded a stud 45 having a nut 46. The rotary cutter 47 may be mounted on the stud 45 and held at a predetermined inclination to the working face of a dressing wheel 48 so as to form the periphery of the cutter at a specified inclination to the sides thereof, or to relieve the sides of the teeth of such cutter, as illustrated in Fig. 7. Obviously, the cutter may also be positioned so as to enable the cutting face of such cutter teeth to be dressed by the wheel 48, as illustrated in Fig. 8. The bolt 21 when tightened firmly secures the adaptor 40 to the disc 19.

Although but one specific embodiment of this invention has been herein shown and described, it will be understood that numerous details of the construction shown may be altered or omitted without departure from the spirit of this invention as defined by the following claims.

What I claim is:

1. An adjustable tool dressing fixture including a fixed base, a turn table including a tool clamp, and a universal joint between said base and turn table including a pair of pivotal elements each having graduations thereon for indicating their inclination with respect to said base, the pivotal axes of said elements being a fixed distance apart, perpendicular to each other, and one of said axes being in all of its positions substantially tangent to a circle described about the other axis.

2. An adjustable tool dressing fixture including a fixed base, an element pivotally mounted on said base having indicia thereon for indicating its inclination with respect to said base, a support pivotally mounted on said element having an axis tangent in all its positions to a circle described about the axis of said pivotal element and including indicia for indicating the inclination of said support with respect to said base, and a tool clamp journaled on said support having an axis perpendicular to the axis of said support and including indicia for indicating the angular relation of said clamp with respect to the axis of said support.

3. An adjustable tool dressing fixture including a fixed base having a protruding lug provided with an aperture, a universal joint element having a bifurcated end straddling said lug provided with apertures registering with the aperture of the latter, a pivot extending through said registering apertures, a second universal joint element having a bifurcated end straddling an end of said first universal joint element, a member pivotally supporting the second element on the first element, said member being in all its positions tangent to a circle described about the axis of said pivot, a disc on the free end of the second joint element, and a turntable rotatably mounted on said disc including a tool clamp and having an axis normal to the axis of said second joint element and lying in a plane in which the axis of said pivot is disposed.

4. Apparatus for adjustably holding a cutting tool against a working surface of a grinding wheel including a base portion, a link pivotally mounted on said base portion having an axis substantially normal to the plane of said working surface, a support pivotally mounted on said link having an axis tangent to a circle described about the axis of said link and substantially parallel to said working surface, and a tool clamp journaled on said support having an axis substantially perpendicular to the axes of said link and said support, said support being rotatable about its axis for bringing an extremity of said tool to a desired inclination to the plane of one side thereof and said tool clamp being rotatable about its axis for bringing said extremity to a desired inclination to a plane perpendicular to said side and said link being tiltable about its axis for bringing the latter side face into a desired inclination to the periphery of said grinding wheel.

AUSTIN J. KILMER.